(12) United States Patent
Miars et al.

(10) Patent No.: US 12,587,288 B2
(45) Date of Patent: Mar. 24, 2026

(54) SELF-PASSIVATING METAL ANTENNA

(71) Applicant: NORTHROP GRUMMAN SYSTEMS CORPORATION, Falls Church, VA (US)

(72) Inventors: Grant Camden Miars, San Diego, CA (US); Scott Richard Burnside, McClellan, CA (US); Thomas James Roush, Carmichael, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 143 days.

(21) Appl. No.: 18/394,565

(22) Filed: Dec. 22, 2023

(65) Prior Publication Data

US 2025/0211340 A1 Jun. 26, 2025

(51) Int. Cl.
| | |
|---|---|
| *H04B 13/02* | (2006.01) |
| *H01Q 1/04* | (2006.01) |
| *H01Q 1/27* | (2006.01) |
| *H01Q 1/36* | (2006.01) |

(52) U.S. Cl.
CPC .............. *H04B 13/02* (2013.01); *H01Q 1/04* (2013.01); *H01Q 1/276* (2013.01); *H01Q 1/364* (2013.01)

(58) Field of Classification Search
CPC . H04B 13/02; H04B 5/24; H04B 5/45; H04B 5/77; H01Q 1/04; H01Q 1/276; H01Q 1/273; H01Q 1/32; H01Q 1/3208; H01Q 1/325; H01Q 1/3283; H01Q 1/364; H01Q 1/38
See application file for complete search history.

(56) References Cited

U.S. PATENT DOCUMENTS

| | | | | |
|---|---|---|---|---|
| 4,336,537 | A | * | 6/1982 | Strickland ................ H04B 7/00 |
| | | | | 343/709 |
| 5,592,156 | A | * | 1/1997 | James .................... H04B 13/02 |
| | | | | 367/134 |
| 6,272,072 | B1 | | 8/2001 | Wulich et al. |

(Continued)

FOREIGN PATENT DOCUMENTS

| | | |
|---|---|---|
| CN | 108242588 A | 7/2018 |
| CN | 112151972 A | 12/2020 |

OTHER PUBLICATIONS

WOISR (Notification of Transmittal of the International Search Report and the Written Opinion of the International Search Authority, or the Declaration) mailed on Feb. 14, 2025 for corresponding PCT/US2024/053999.

(Continued)

*Primary Examiner* — Khanh C Tran
(74) *Attorney, Agent, or Firm* — Tarolli, Sundheim, Covell & Tummino LLP

(57) ABSTRACT

A communication device for use while submerged in a fluid or while operating in inclement weather includes a transceiver for transmitting and receiving communication signals, an antenna exposed to a submerged ambient environment formed of a self-passivating material, and a communication cable for propagating the communication signals between the transceiver and the antenna. The antenna is built-in or attached to an exterior hull portion of an aquatic vessel. The communication device is integral with or attachable to a garment, a protective layer or a covering worn by a user.

24 Claims, 5 Drawing Sheets

(56)  References Cited

U.S. PATENT DOCUMENTS

| | | | |
|---|---|---|---|
| 9,893,460 B2 | 2/2018 | Windgassen et al. | |
| 2006/0247711 A1* | 11/2006 | Verhoef | A61N 1/37229 |
| | | | 607/32 |
| 2010/0135122 A1* | 6/2010 | Rhodes | H04B 13/02 |
| | | | 367/134 |
| 2011/0096633 A1 | 4/2011 | Sonnenschein et al. | |
| 2011/0299362 A1* | 12/2011 | Rhodes | H04B 13/02 |
| | | | 367/131 |
| 2016/0233607 A1 | 8/2016 | Windgassen et al. | |
| 2018/0069303 A1* | 3/2018 | Li | H01Q 1/273 |
| 2023/0229314 A1 | 7/2023 | Gray et al. | |
| 2023/0353256 A1* | 11/2023 | Rhodes | H04B 5/24 |
| 2023/0365241 A1 | 11/2023 | Hamilton et al. | |

OTHER PUBLICATIONS

TWOA: "Office Action issued Jun. 23, 2025 for corresponding TW application No. 113142926" ~ translation attached.

* cited by examiner

300

304

306

302

400

402

404

500

502 — Propagating a transmission radio frequency (RF) signal to an antenna comprising a self-passivating material 504 — Transmitting the RF signal via the antenna comprising the self-passivating material 506 — Receiving a received RF signal via the antenna comprising the self-passivating material 508 — Propagating the received RF signal to a host device

SELF-PASSIVATING METAL ANTENNA

BACKGROUND

A variety of different antennas exist to provide wireless communication. One example includes a patch antenna. A patch antenna is a narrowband, wide-beam antenna fabricated by etching the antenna element pattern in metal trace and bonded to an insulating dielectric substrate with a continuous metal layer. A ground plane is bonded to the opposite side of the substrate. Some patch antennas do not use a dielectric substrate and instead are made of a metal patch mounted above a ground plane using dielectric spacers. Patch antennas are often mounted to the exterior of a vehicle. The ability to create high gain arrays in a low-profile antenna is one reason that patch arrays are common in military and research applications.

SUMMARY

The following is a brief summary of subject matter that is described in greater detail herein. This summary is not intended to be limiting as to the scope of the claims.

In a first example, a communication device includes a transceiver configured to at least one of transmit and receive communication signals. An antenna exposed to a submerged ambient environment is formed at least in part from a self-passivating material. The antenna is configured to at least one of wirelessly transmit and receive the communication signals. A communication cable is configured to propagate the communication signals between the transceiver and the antenna.

According to a second example, a method of communicating with a communication device includes propagating a transmission radio frequency (RF) signal from a transceiver to an antenna that is exposed to a submerged environment or to an exterior ambient environment and formed at least in part from a self-passivating material. The method includes transmitting the RF signal via the antenna. The method includes receiving a received RF signal via the antenna. The method includes propagating the received RF signal to the transceiver.

In a third example, a wearable communication device includes a transceiver configured to at least one of transmit and receive communication signals. An antenna formed at least in part from a self-passivating material. The antenna is attached to an exterior of apparel worn or carried by a user and exposed to atmosphere. The antenna is configured to at least one of wirelessly transmit and receive the communication signals. A communication cable is configured to propagate the communication signals between the transceiver and the antenna.

According to a fourth example, an underwater communication device includes a transceiver arranged in a waterproof environment and configured to at least one of transmit and receive communication signals. An antenna is formed at least in part from a self-passivating material and is exposed to a submerged environment. The antenna is configured to at least one of wirelessly transmit and receive the communication signals. A communication cable is configured to propagate the communication signals between the transceiver and the antenna.

BRIEF SUMMARY OF THE DRAWINGS

The general inventive concepts, as well as illustrative examples and advantages thereof, are described below in greater detail, by way of example, with reference to the drawings in which.

DETAILED DESCRIPTION

Figure 1:
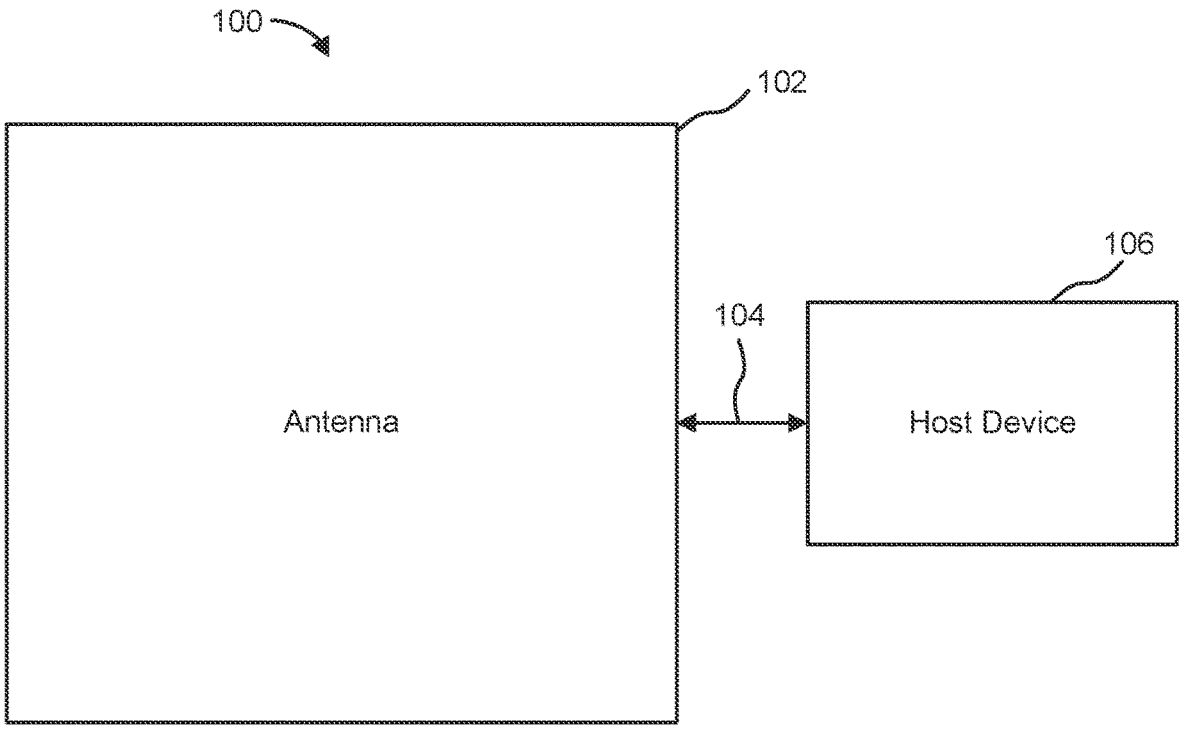
FIG. 1 illustrates the overall system block diagram.

This disclosure relates generally to an antenna, and more specifically to an antenna capable of operating in a submerged ambient environment. As described herein, the term "submerged ambient environment" refers to an environment that is partially or completely beneath the surface of a volume of fluid (e.g., water), or can refer to a wet environment that can correspond to an otherwise hostile environment for electrical conduction, such as an ambient environment in high humidity or is prone to fluid exposure (e.g., dripping or spraying). Therefore, the example antennas described herein can operate in a submerged ambient environment without short-circuits resulting from electrical arcing through the associated fluid. As an example, the antenna can be attached to the exterior hull of an aquatic vehicle without having insulation or being encased in a waterproof housing. In another example, the antenna can be worn on personal apparel in inclement weather or in an aquatic environment while maintaining the ability to receive and transmit communication signals. The antenna can include radiating elements having self-insulating and corrosion resistant properties to enable the antenna to operate when exposed to open sea water. The antenna can be formed from any of a variety of self-passivating materials (e.g., niobium, tantalum, titanium, zirconium, molybdenum, ruthenium, rhodium, palladium, hafnium, tungsten, rhenium, osmium, and iridium) that form a corrosion-resistant, insulating oxide layer over the surface of the radiating elements for operation while being submerged in water.

Wireless communications and data transfer in a submerged ambient environment using radio signals is preferable over acoustic signaling or optical signaling due to the elimination of noise caused by reflections of the signal from solid objects and the effective absence of the doppler effect. Radio communications systems can operate over several co-existing channels with little to no interference. By constructing the antenna with self-passivating materials, the high electrical conductivity of seawater does not cause short-circuiting of the radiating element that can prohibit transmission of electromagnetic signals in the radio spectrum.

As an example, the antenna can be formed as a patch antenna, whip antenna, blade antenna, or various other antennas for use while submerged in a fluid, and thus to operate in a submerged ambient environment (e.g., underwater). The radiating element of the antenna includes a self-passivating material bonded to a dielectric layer. The radiating element can be formed from the self-passivating material or coated with a self-passivating material in a prior manufacturing process (e.g., including a preconditioning process). The dielectric layer can be bonded to a ground plane, itself using the self-passivating material so that the antenna does not need an additional housing to encase the radiating elements. The antenna can generally be coupled via a transmission line which can feed electrical signals to and from the antenna and a host device (e.g., radio transceiver, GPS receiver, etc.). Electromagnetic signals transmitted by the antenna can similarly be received by receivers of other submerged objects comprising the antennas. In one example, the antenna can be flexible to fit around the curvature of a ship hull. The antenna can be bonded to aquatic life for research data transmission. In an alternative example, the antenna can be made of a rigid material for stability.

As another example, the antenna can be worn on personal apparel that is exposed to an ambient external environment and/or to a submerged environment, such as by a soldier conducting military operations, which allows for communication in inclement weather and/or underwater. In the example of personal apparel, the antenna can be integral with or attachable to any wearable garment, protective gear or covering of a user (e.g., a vest, jacket, helmet, wet suit, etc.), and can be configured to conform to a contour on the user's body.

Referring to FIG. 1, there is illustrated a diagram of an antenna system 100 that can work in both a transmission mode and a receiving mode. The antenna 102 can be a multi-layered antenna that can be available on or incorporated into a garment, covering, ship hull, marine structure, or aquatic life. A radiating element made of a self-passivating material can be configured to allow bends in the material to conform to a surface. As an example, the antenna 102 can be arranged as a patch antenna, whip antenna, blade antenna, or various other antennas. The antenna 102 arranged as a patch antenna, bow-tie dipole antenna, whip antenna, blade antenna, or various other antennas can include a dielectric layer below the radiating elements that can be made of a flexible or solid dielectric material which can be configured to control the radiation characteristics of the radiating element. For the antenna 102 arranged as a patch antenna, whip antenna, blade antenna, or various other antennas, a ground plane layer made of a self-passivating material can be bonded to the surface of the antenna carrier. The antenna 102 can be bonded or attached to of the hull of a ship, a pier piling or building, the body of a vehicle, or the gear that a user is wearing or carrying. The antenna system 100 can connect to a transceiver 106 that can be carried by the user or a part of the electronics package of a ship or vehicle. The transceiver 106 can be arranged in a waterproof environment and configured appropriately for at least one of transmit and receive communication signals. A communication cable 104 (e.g., a coaxial signal line or balanced signal line) connects the antenna 102 and the transceiver 106.

The antenna 102 can be configured for transmitting and receiving voice and data communications while submerged in a fluid without short-circuiting by forming an insulating film on the surface of the antenna 102. The antenna can be fed from an RF transmission line carrying RF energy. The antenna system 100 can make use of different communication protocols combining wide coverage technologies such as but not limited to public land mobile networks (e.g. 2G to 5G systems, including machine to machine communications based on NB-IoT or M-Cat), local area networks (e.g. WiFi-802.11 protocols), body area networks (e.g. Bluetooth/ Bluetooth low energy or near field communications), or wireless sensor networks (e.g. ZigBee, LoRa, eNOcean or IQRF, among others). In one example, the antenna 102 can be a driven array for transmitting and receiving omnidirectional radio frequency energy for the antenna system 100. Efficient communications over a long range by radiating electromagnetic waves can be achieved in a submerged ambient environment (e.g., underwater) by the antenna 102 with dimensions on the order of one half of one wavelength or more.

In the example of a patch antenna, the antenna 102 can include a dielectric layer made of dielectric material configured to control the radiation characteristics of the antenna system 100. The permittivity of the dielectric material used in the dielectric layer affects the radiation pattern of the antenna 102. When the antenna 102 is embedded in a high-permittivity material, the size of the antenna 102 can be reduced in accordance with the decreased wavelength of the electromagnetic waves in the immediate vicinity of the antenna system 100. By pairing circuit miniaturization techniques with the antenna 102 configured with high-permittivity materials, the antenna 102 can be produced in a miniaturized form. With the use of high-permittivity materials, high-directivity antennas are able to transmit and receive information over greater distances.

Low-permittivity material in the dielectric layer provides a lower dielectric constant which is helpful to decrease the loss of the signal. The lower the dielectric constant of the dielectric material used, the lower the signal delay and the higher the signal fidelity. Low dielectric polymer materials are known to be used with communication substrate materials (e.g., polytetrafluoroethylene (PTFE), liquid crystal polymer (LCP), and polyimide (PI) among others). The dielectric constant of some polymers are fairly large such as epoxy resin. In terms of electrical properties, low-permittivity material in the dielectric layer can have low loss and low leakage of current. With regards to mechanical properties, the low permittivity material has less adhesion, rigidity, and strength qualities than higher permittivity material.

The antenna system 100 can include higher or lower-permittivity material in the dielectric layer depending on the application. A laminate, foam, or other material can ensure that electric fields associated with the antenna 102 are not concentrated in the dielectric layer region of the overall antenna 102. The ground plane layer comprising self-passivating material is the base layer of the antenna 102 and provides a buffering between the antenna 102 and the user or vehicle. The antenna 102 can be formed integral with, or attachable to any wearable garment, protective gear, skin of aquatic life, structural surface, or vehicle surface.

The communication cable 104 can include a splitter or combiner of RF signals and can be used to deliver a centralized reference signal to a plurality of antenna 102. The communication cable can include a switch, coupler, or other RF functions for signal control. A wide range of applications can be applied to the antenna system 100 (e.g., GSM, CDMA, LTE, Bluetooth, GNSS (GPS, GLONASS, and Galileo), qualification of active and passive cellular and wireless front-end components, research and development (R&D), security systems, remote control systems, air interface emulation, Wi-Fi communication testing, and fading simulation). The antenna system 100 can be radio based to provide an interface point to point link between an active base station and a mobile station.

The transceiver 106 includes a transmitter for transmitting electromagnetic signals to a remote receiver, and a receiver for receiving signals from the transmitter, wherein at least one of the transmitter and receiver is in a submerged ambient environment and has an antenna 102 comprising self-passivating material. As another example, at least one of the transmitter and receiver may be above water and may have an antenna 102 comprising self-passivating material.

Figure 2:
FIG. 2 illustrates a perspective view of the antenna.
Figure 2:
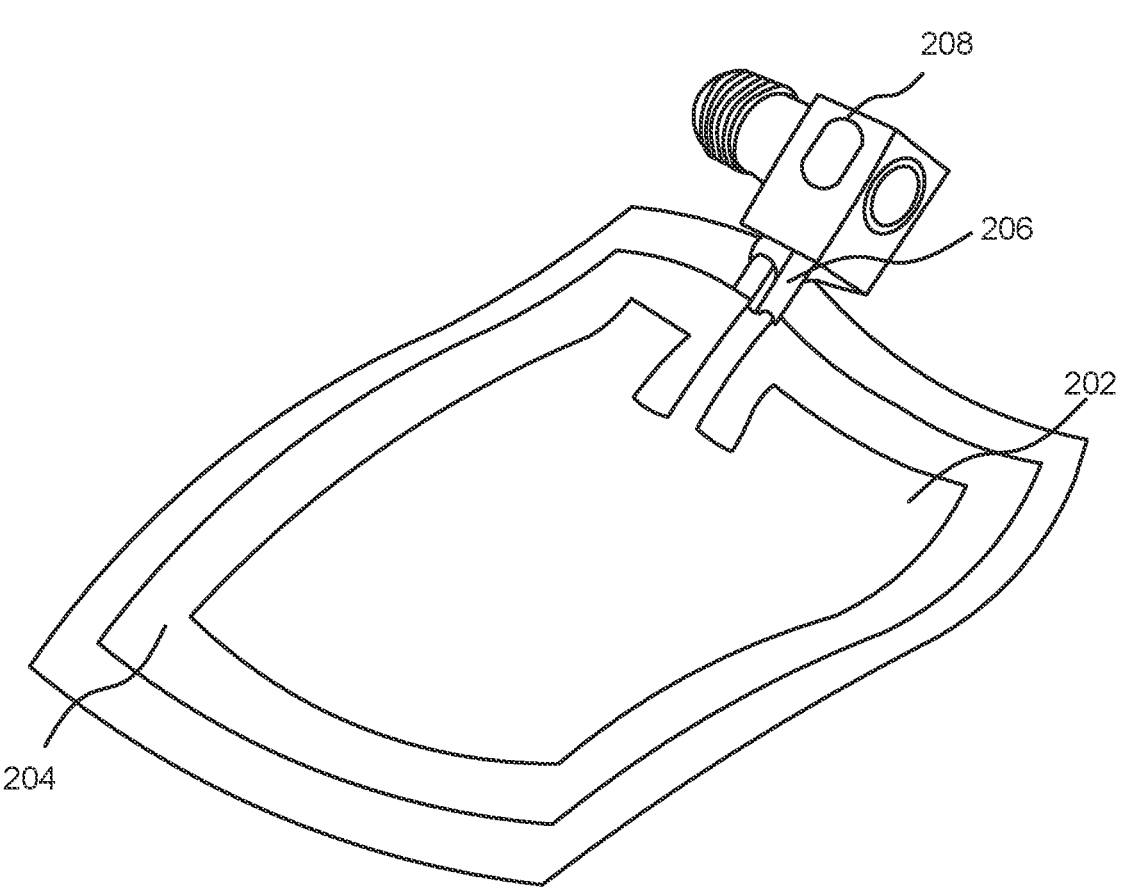

Turning now to FIG. 2, there is illustrated a perspective view of an antenna 200 that can be used to transmit and receive radio frequency signals while submerged in fluid or worn in inclement weather (e.g., rain, snow, high humidity, etc.). As shown, the antenna 200 generally comprises a microstrip patch 202 made of a self-passivating material which can be self-insulating and corrosion resistant, a dielectric layer (not shown), a ground layer 204 made of self-passivating material, signal transmission lines 206, and an RF connector 208.

In an example, the antenna 200 can be made of self-passivating metals having one or more surface regions that form an insulator when submerged in or in contact with a fluid.

The antenna 200 can connect to a host device (not shown) having transceiver circuitry that is carried by the user or mounted for the user to access in a vehicle or garment. The signal transmission lines 206 provide a suitable path for received and transmission signals to travel to and from the RF connector 208. Common connectors can be microstrip launchers. Alternatively, the RF connection can be made via RF feed-throughs or aperture coupling.

The antenna 200 can be built-in or attached to an aquatic vessel or gear that a user is wearing or carrying. The antenna 200 can be attached to the surface of an aquatic vessel or a user's gear by any known means, including but not limited to adhesive, stitching, and ultrasonic welding. The attachment may be at regular or irregular intervals and may be in a set pattern, such as a plurality of straight lines. The antenna 200 can be attached to the aquatic vessel or a user's gear such that at least a portion of the antenna 200 can be non-planar. The resulting non-planar attachment gives the antenna 200 more of a visual obscurity and helps the antenna 200 blend in with the contour of the surface.

The antenna 200 can convey a variety of different types of information including but not limited to audio transmission, video transmission, text data transmission, control data, and other forms of information that can be encoded/decoded in digital form. In one example, audio transmission includes diver to diver voice, diver to vessel voice, diver to shore voice, voice using a remote microphone and/or hydrophone, voice between submarine and submarine, voice between submarine and surface vessel, and voice between submarine and shore station. In another example, text data includes diver to diver communication and diver to shore or vessel communication. In another example, control data includes data used as part of the communication aspects of supervisory control and acquisition systems (SCADA) and of command and control systems for underwater vessels including backup for wired control.

The antenna 200 can perform information transfer such as data transmitted from/to seismic, geophysical, environmental, underwater data loggers (e.g., surface vessel, AUV, or ROV), data of generic types transferred between an AUV and a surface vessel or docking station, data transferred from sensors to a vessel or shore for monitoring of the environment, detection of alien objects as part of homeland security, data and communication control protocols required for provision of internet and other communication access points (e.g., swimming pools, reservoirs, sea water areas around shipwreck sites, etc.), data communicated through ice both solid and floating, data over communication links in the networking sensors, assets, vehicles, and people, not all of which being underwater, data transferred for targeting and priming to/from a torpedo or other vehicles while in a torpedo bay or in motion.

The RF connector 208 arrangement can be implemented so that the antenna 200 and a host device (not shown) include a power transfer arrangement for transmitting electrical power between the antenna 200 and the host device. The power transfer arrangement comprises respective parts in the antenna 200 and the host device which cooperate to transfer power through inductive coupling and/or capacitive coupling. In one example, for relatively small physical components, care is given to the relative placement of the antenna 200 and the inductive, capacitive, or other power transfer parts in order to avoid interference of the data signals. The power transfer arrangement can be disposed to allow power to be transferred with the antenna 200 and the host device at a plurality of positions. The antenna 200 can be wireless and provide for receiving and/or transmitting wireless radiation between the antenna 200 and the host device, wherein the wireless antenna is provided with a dynamically-controlled impedance matching network arrangement for compensating for changes in antenna electrical impedance characteristics when, in operation, pressure applied via water to the connector changes. The antenna 200 can be implemented such that the wireless arrangement can be adapted to provide wireless data transfer between the antenna 200 and the host device.

The antenna 200 connector arrangement can be implemented such that the antenna 200 and the host device components have associated therewith data and/or a power conditioning apparatus for conditioning data signals and/or power transfer signals for interfacing to the antenna 200 and the host device. The underwater connector arrangement can be implemented such that the connector arrangement can be adapted for use with ocean submarine vehicles (e.g., remotely operated vehicles (ROV)). For example, the antenna 200 and the host device can be provided on a remotely operated arm of an ROV. In another example, the underwater connector arrangement can be adapted for use with distributed ocean wave energy production systems.

Figure 3:
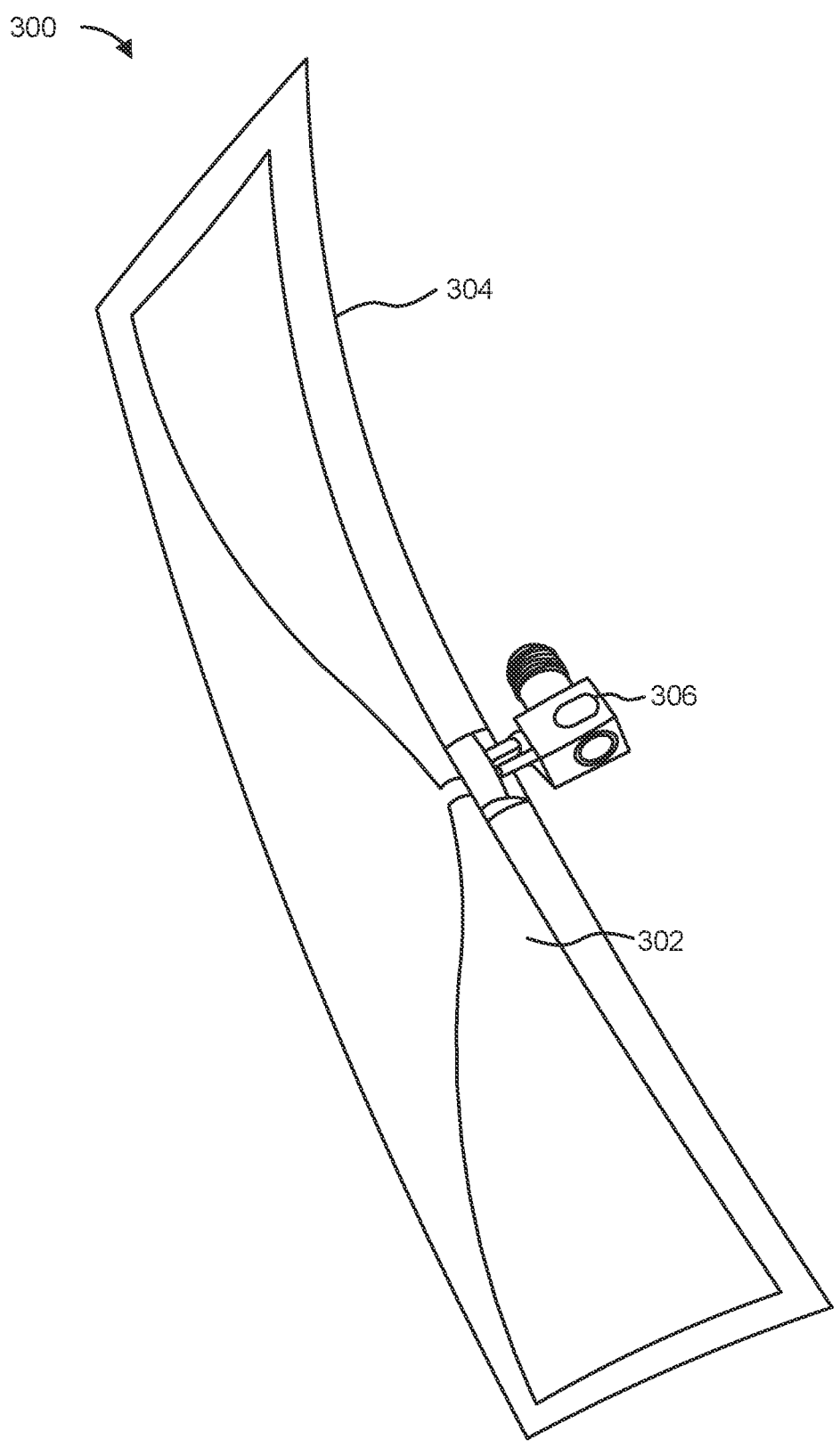
FIG. 3 illustrates a perspective view of the bow-tie dipole antenna.

Turning now to FIG. 3, there is illustrated a bow-tie dipole antenna 300 including a conducting layer 302 made of self-passivating material forming the two halves of the bow-tie, a carrier substrate 304 of insulating dielectric material, and an RF connector 306 (e.g., a water-tight SMA). The bow-tie dipole antenna 300 can be flexible to conform to a surface of which the antenna is mounted. The bow-tie dipole antenna 300 can be mounted on a non-conducting surface (e.g., a plastic container, a vessel, a pier, a building wall, etc.)

The bow-tie dipole antenna 300, formed at least in part of a self-passivating material, can be configured for omnidirectional transmitting and receiving electromagnetic fields while being submerged under water. A signal can be provided to the bow-tie dipole antenna 300 for excitation. The bow-tie dipole antenna 300 can be coupled to or stacked on a plurality of additional antennas.

The bow-tie dipole antenna 300 can be coupled, by a signal transfer line, to any system that has the necessity to emit an electromagnetic field (e.g., communications, navigation, surveillance, etc.) The bow-tie dipole antenna 300 can be configured to emit the EM field based on intensity requirements.

Figure 4:
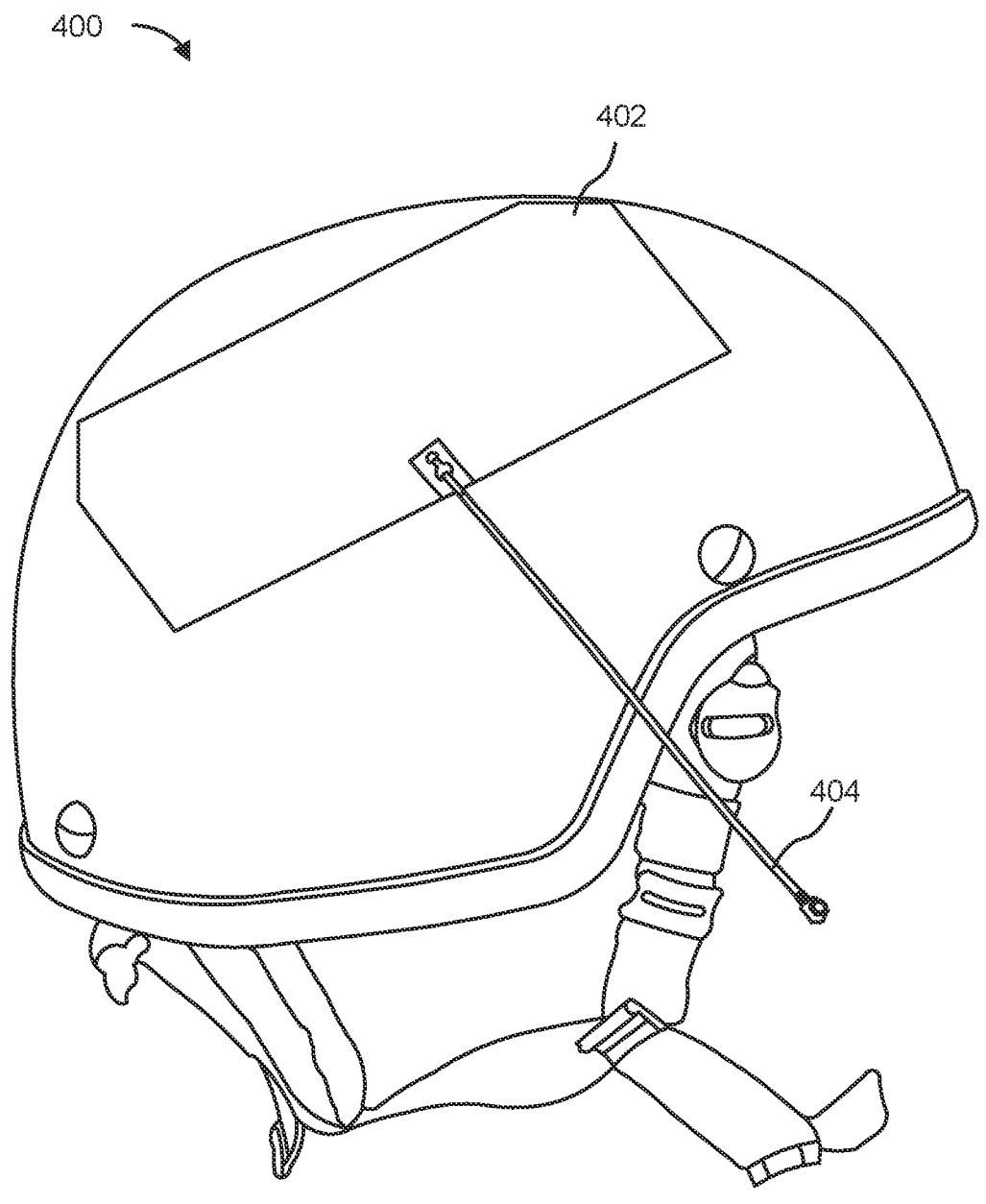
FIG. 4 illustrates a perspective view of a helmet comprising the antenna.

Turning now to FIG. 4, considering variations and alternative examples of an antenna, it is possible that an antenna can be secured to a wearable garment or covering to provide a low-impact unrestrictive antenna system for communications, data connections, telemetry, etc.

In FIG. 4, there is illustrated a head-protective helmet 400 including an antenna 402 made of self-passivating material mounted on the helmet for using a radio transceiver, operating any wireless communication devices, or communication in the intercom mode between a plurality of users. The antenna 402 mounted to the head-protective helmet 400 worn by the user can receive and transmit voice and/or data communications.

Although placing the antenna 402 on the vertex of the head-protective helmet 400 is shown, other bodily areas of the user can be utilized including across the back, across the chest, down the sleeve, down the pant leg, etc. The antenna 402 can be attached to a wristband. The antenna 402 can be embedded in the interior of the head-protective helmet 400 or mounted on the exterior of the head-protective helmet 400. In one example, the antenna 402 bends around the contour of the crown of the head, which enables the user to communicate hands-free having the antenna embedded inside the head-protective helmet 400.

The head-protective helmet 400 can include a suitable rigid outer shell having the antenna 402 fit to the contour of the helmet. The antenna 402 can be attached to a suitable soft material covering that allows for the antenna 402 to bend around the user's head or folding of the material. In the example of FIG. 4, the antenna 402 is mounted to the garment by sew in, hook and loop pads, adhesive, rivet, or other suitable fasteners. The antenna 402 can be embedded within, lie on, or rest under the surface of the garment.

A communication cable 404 is coupled to the antenna 402 for connecting to the radio transceiver (not shown). The communication cable 404 can also run along the contour of the user's body and can be embedded within, lie on, or rest under the surface of the garment equipped with the antenna 402. The communication cable 404 is lightweight, thin, and unnoticeable as it can be run through the user's clothing, backpack, armor, helmet, etc. By connecting the antenna 402 directly to the radio transceiver via the communication cable 404, the user has a wider range of motion of the limbs. The antenna 402 can be configured for transmitting and receiving voice and data communications while operating in inclement weather (e.g., rain snow, high humidity, etc.) or while the user is submerged in an aquatic environment.

Figure 5:
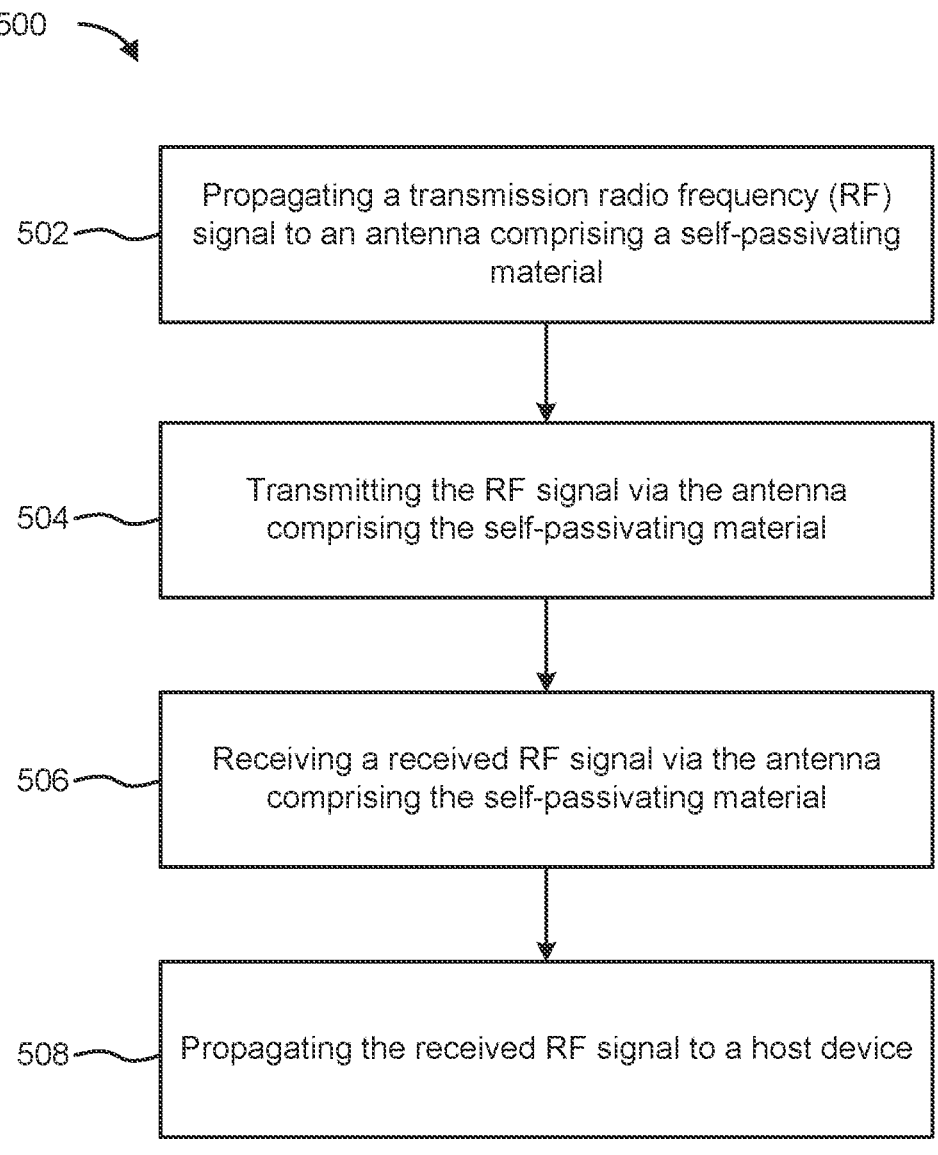
FIG. 5 is a block flow diagram for a method in which a communications system performs communication in accordance with one or more examples described herein.

Referring now to FIG. 5, illustrated is a flow diagram 500 for a method in which a communications system performs communication in accordance with one or more examples described herein.

At 502, the flow diagram 500 comprises transferring a transmission radio frequency (RF) signal from a transceiver to an antenna that is exposed to a submerged environment or to an exterior ambient environment and formed at least in part from a self-passivating material.

At 504, the flow diagram 500 comprises transmitting the RF signal via the antenna.

At 506, the flow diagram 500 comprises receiving a received RF signal via the antenna. The steps 504 and 506 can occur in the opposite order, and are provided merely to demonstrate that the antenna can both transmit and receive RF signals.

At 508, the flow diagram 500 comprises transferring the received RF signal to the transceiver.

The performing communication can further comprise submerging the antenna in a fluid to form an insulating layer on the surface of the antenna to prevent short-circuiting during transmitting and/or receiving of the RF signal.

The above description includes non-limiting aspects of the various examples. It is, of course, not possible to describe every conceivable combination of components or methods for purposes of describing the disclosed subject matter, and one skilled in the art may recognize that further combinations and permutations of various examples are possible. The disclosed subject matter is intended to embrace all such alterations, modifications, and variations that fall within the spirit of the appended claims.

With regard to the various functions performed by the above described components, the terms (including a reference to a "means") used to describe such components are intended to also include, unless otherwise indicated, any structure(s) which performs the specified function of the described component (e.g., functional equivalent), even if not structurally equivalent to the disclosed structure. In addition, while a particular feature of the disclosed subject matter may have been disclosed with respect to only one of several implementations, such a feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited to such examples. In addition, any aspect or design described herein as "exemplary" and/or "demonstrative" is not necessarily to be construed as preferred or advantageous over the other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The description of illustrated examples of the subject disclosure as provided herein, including what is described in the Abstract, is not intended to be exhaustive or to limit the disclosed examples to the precise forms disclosed. While specific examples are described herein for illustrative purposes, various modifications are possible that are considered within the scope of such examples, as one skilled in the art can recognize. In this regard, while the subject matter has been described herein in connection with various examples and corresponding drawings, where applicable, it is to be understood that other similar examples can be used or modifications and additions can be made to the described examples for performing the same, similar, alternative, or substitute function of the disclosed subject matter without deviating therefrom. Therefore, the disclosed subject matter should not be limited to any single example described herein, but rather should be construed in breadth and scope in accordance with the appended claims below.

What is claimed is:

1. A communication device comprising:
a transceiver configured to at least one of transmit and receive communication signals;
an antenna exposed to a submerged ambient environment, the antenna formed at least in part from a self-passivating material, the self-passivating material forming a corrosion-resistant, insulating oxide layer over a surface of portions of the antenna resulting from direct contact of the antenna with the submerged ambient environment, the antenna being configured to at least one of wirelessly transmit and receive the communication signals; and
a communication cable configured to transfer the communication signals between the transceiver and the antenna.

2. The communication device of claim 1, wherein the antenna is built-in or attached to an exterior hull portion of an aquatic vessel.

3. The communication device of claim 2, wherein the antenna conforms to the contour of the exterior hull portion of the aquatic vessel.

4. The communication device of claim 1, wherein the antenna is integral with or attachable to a garment, a protective layer, or a covering worn by a user.

5. The communication device of claim 1, wherein the antenna is a patch antenna, a whip antenna, a planar bow-tie antenna, or a blade antenna.

6. The communication device of claim 1, wherein the antenna is a first antenna of a plurality of antennas, wherein the communication cable comprises a splitter to deliver a centralized reference signal to the plurality of antennas.

7. The communication device of claim 1, wherein the transceiver comprises a transmitter for transmitting the communication signals to a remote receiver and a receiver for receiving the communication signals, wherein at least one of the transmitter and the receiver is underwater.

8. A method of communicating with a communication device, the method comprising:

exposing an antenna formed in part from a self-passivating material to a submerged ambient environment, the self-passivating material forming a corrosion-resistant, insulating oxide layer over a surface of portions of the antenna resulting from direct contact of the antenna with the submerged ambient environment;

transferring a transmission radio frequency (RF) signal from a transceiver to the antenna;

transmitting the RF signal via the antenna;

receiving a received RF signal via the antenna; and transferring the received RF signal to the transceiver.

9. The method of claim 8, further comprising: submerging the antenna in a fluid to form an insulating layer on the surface of the antenna to prevent short-circuiting during at least one of transmitting and receiving of the RF signal.

10. A wearable communication device comprising:

a transceiver configured to at least one of transmit and receive communication signals;

an antenna formed at least in part from a self-passivating material, the antenna being attached to an exterior of apparel worn or carried by a user and exposed to atmosphere, the self-passivating material forming a corrosion-resistant, insulating oxide layer over a surface of portions of the antenna resulting from direct contact of the antenna with a submerged ambient environment, the antenna being configured to at least one of wirelessly transmit and receive the communication signals; and a communication cable configured to transfer the communication signals between the transceiver and the antenna.

11. The wearable communication system of claim 10, wherein the antenna is integral with or attachable to a garment, a protective layer, or a covering worn by a user.

12. The wearable communication system of claim 11, wherein the antenna is mounted to the garment, the protective layer, or the covering by sew in, hook and loop pads, adhesive, or rivet.

13. The wearable communication system of claim 10, wherein the antenna is flexible to conform to a contour, bend, or fold of the garment or the covering.

14. An underwater communication device comprising:

a transceiver arranged in a waterproof environment and configured to at least one of transmit and receive communication signals;

an antenna that is formed at least in part from a self-passivating material and that is exposed to a submerged ambient environment, the self-passivating material forming a corrosion-resistant, insulating oxide layer over a surface of portions of the antenna resulting from direct contact of the antenna with the submerged ambient environment, the antenna being configured to at least one of wirelessly transmit and receive the communication signals; and a communication cable configured to transfer the communication signals between the transceiver and the antenna.

15. The underwater communication device of claim 14, wherein the antenna is built-in or attached to an exterior hull portion of an aquatic vessel.

16. The underwater communication device of claim 15, wherein the antenna conforms to the contour of the exterior hull portion of the aquatic vessel.

17. The underwater communication device of claim 14, wherein the antenna is integral with or attachable to a garment, a protective layer, or a covering worn by a user.

18. The underwater communication device of claim 14, wherein the antenna is a patch antenna, a whip antenna, a planar bow-tie antenna, or a blade antenna.

19. The underwater communication device of claim 14, wherein the antenna is a first antenna of a plurality of antennas, wherein the communication cable comprises a splitter to deliver a centralized reference signal to the plurality of antennas.

20. The underwater communication device of claim 14, wherein the transceiver comprises a transmitter for transmitting the communication signals to a remote receiver and a receiver for receiving the communication signals, wherein at least one of the transmitter and the receiver is underwater.

21. The underwater communication device of claim 14, wherein the antenna provides at least one of communication from a first diver to a second diver, communication from the first diver to a surface vessel, and communication from the first diver to a shore station.

22. The underwater communication device of claim 14, wherein the antenna provides communication using at least one of a remote microphone and a hydrophone.

23. The underwater communication device of claim 14, wherein the antenna provides at least one of communication between a first submarine and a second submarine, communication between the first submarine and a surface vessel, and communication between the first submarine and a shore station.

24. The underwater communication device of claim 23, wherein the antenna provides at least one communication between the first diver or the first submarine and an underwater structure.

* * * * *